No. 894,411. PATENTED JULY 28, 1908.
J. A. VINCENT.
OILING DEVICE FOR PRESSURE FLUID MOTORS.
APPLICATION FILED JAN. 27, 1908.
2 SHEETS—SHEET 1.
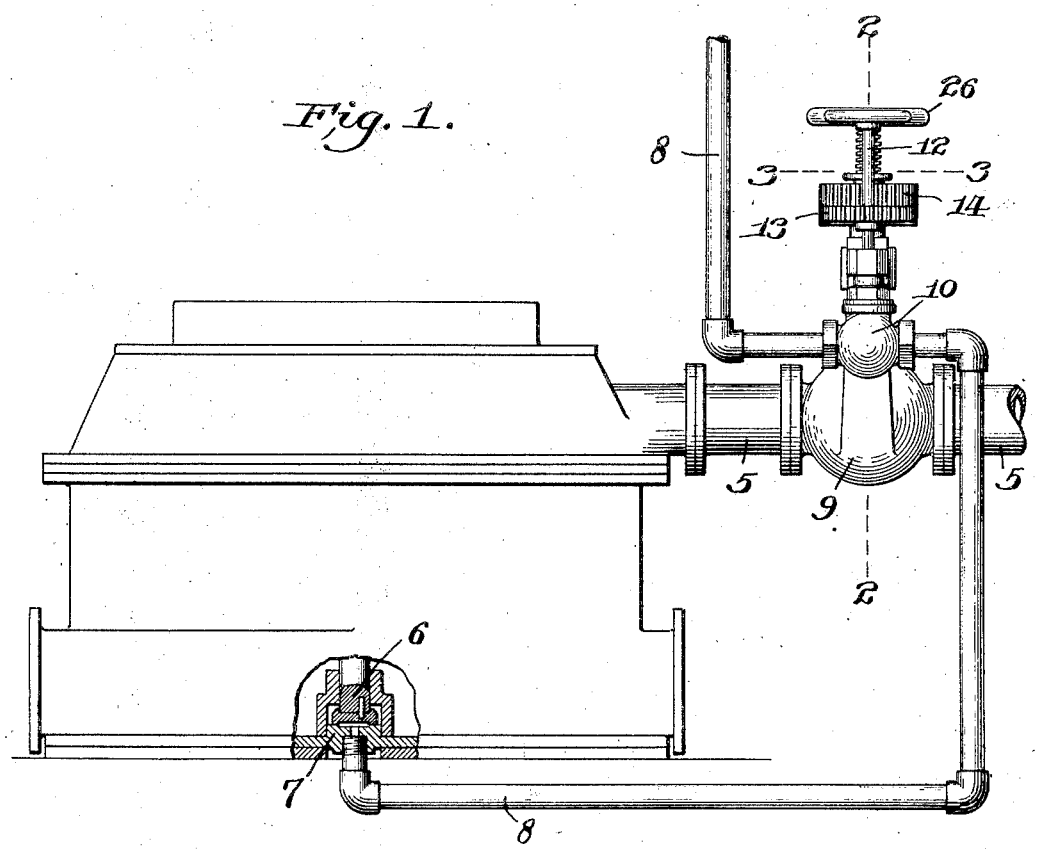
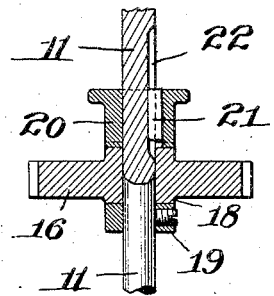
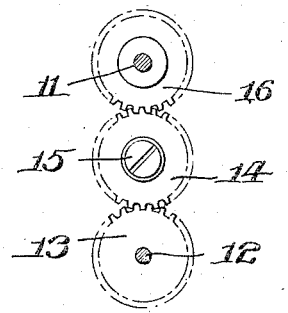
WITNESSES:
INVENTOR
Joseph A. Vincent
BY
ATTORNEY.

No. 894,411. PATENTED JULY 28, 1908.
J. A. VINCENT.
OILING DEVICE FOR PRESSURE FLUID MOTORS.
APPLICATION FILED JAN. 27, 1908.
2 SHEETS—SHEET 2.
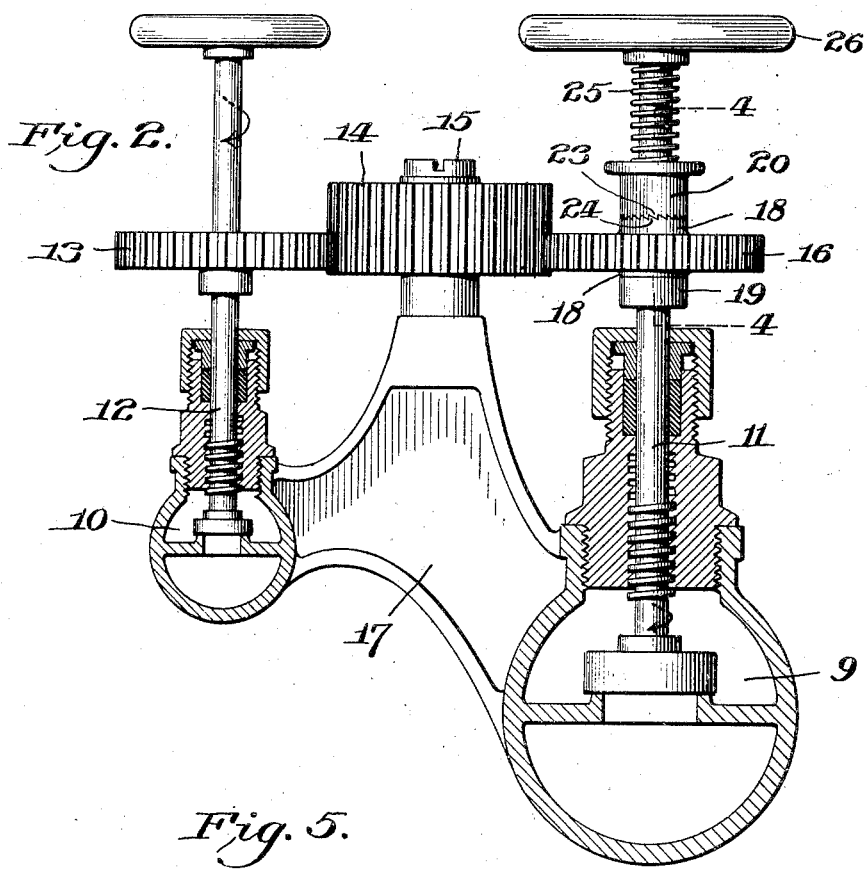
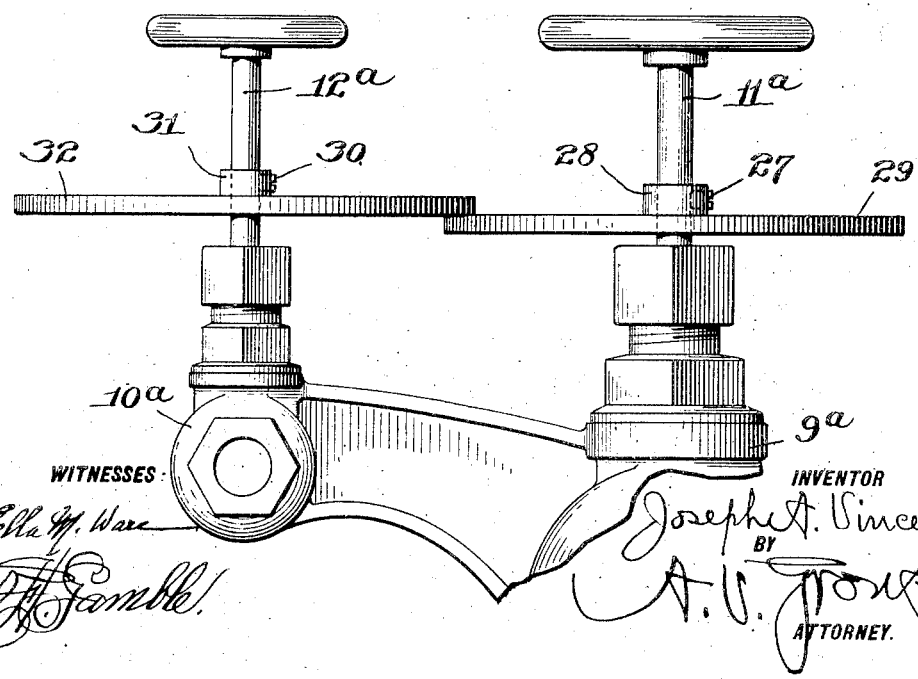

UNITED STATES PATENT OFFICE.

JOSEPH A. VINCENT, OF PHILADELPHIA, PENNSYLVANIA.

OILING DEVICE FOR PRESSURE-FLUID MOTORS.

No. 894,411.

Specification of Letters Patent.

Patented July 28, 1908.

Application filed January 27, 1908. Serial No. 412,692.

*To all whom it may concern:*

Be it known that I, JOSEPH A. VINCENT, a citizen of the United States, residing at Philadelphia, in the county of Philadelphia and State of Pennsylvania, have invented certain new and useful Improvements in Oiling Devices for Pressure-Fluid Motors, of which the following is a specification.

In fluid operated motors, there are employed a pipe through which the operating fluid passes to the motor, and a valve to control the pipe. There is also employed an oil pipe, provided with a valve, leading to one or more of the moving parts of the motor, by means of which lubricating oil may be fed to said part or parts during the operation of the motor. When the valve for controlling the fluid for operating the motor is opened, and the motor is set in motion, it is necessary that the valve for controlling the oil be also opened, in order that the lubricating oil may be supplied to the motor during the operation thereof. If this is not done, and the motor is operated for any length of time without a supply of lubricating oil, it will, of course, rapidly deteriorate. Particularly is this true in connection with steam turbines of the vertical type, to which my invention is particularly adapted. In this type of turbine the central or main shaft is supported by a film of oil under pressure in the lower bearing, said oil being constantly fed to the bearing during the operation of the turbine. It is a well known fact that in the above mentioned type of turbine, if the oil is not turned on at or before the turning on of the steam, or if the oil is turned off before the steam is turned off, or the machine slows down, or the turbine comes to rest various parts thereof will be rendered useless, or practically so, due to the high speed of the main shaft and the absence of the lubricating oil.

The object of my invention is to provide a simple and efficient means to prevent the opening of the valve for the operating fluid for the motor without opening the valve for the lubricating oil, and to prevent the closing of the valve for the lubricating oil without closing the valve for the operating fluid, and to permit the closing of the valve for the operating fluid without closing the valve for the lubricating oil.

Having this object in view, the invention consists in the novel construction and combinations of parts which will be hereinafter fully described and claimed.

In the drawings:—Figure 1 is an elevation of a fluid operated motor provided with my invention. Fig. 2 is a sectional elevation of the valve mechanism, as on the line 2—2, of Fig. 1. Fig. 3 is a sectional plan view as on the line 3—3, of Fig. 1. Fig. 4 is a sectional detail as on the line 4—4, of Fig. 2. Fig. 5 is a view of a modification of the invention.

In Fig. 1 I have shown, principally in outline, a fluid operated motor of the steam turbine type, which includes the inlet pipe 5 for the steam or operating fluid, and which includes also the central, vertical, rotatable shaft 6, which carries the moving steam buckets, the intermediate steam buckets being supported by the main frame or casing of the motor.

The steam or fluid enters the motor through the pipe 5 from any suitable source of supply, and passes through the moving and stationary steam buckets, and acts upon the same in a manner to rotate the main shaft 6 of the motor. The construction and operation of these parts are common and well known, and no detailed description or illustration thereof is deemed necessary herein, this being merely one well known type of motor in connection with which my invention is adapted to be used.

The lower end of the shaft 6 is mounted in a suitable bearing 7, and leading to the bearing 7, from any suitable source of oil supply, is a pipe 8, through which oil is supplied to the bearing 7 beneath the shaft 6.

The pipe 5 is interrupted by a fluid valve 9, and the pipe 8 is interrupted by an oil valve 10. The valves 9 and 10 are arranged adjacent each other, and the bodies thereof are preferably formed in a single casting 17, as shown. These valves 9 and 10 are of the usual, well known "globe" type, and they are provided with the usual screw-threaded operating stems 11 and 12 respectively, by the manipulation of which, in the usual manner, the valves may be opened and closed.

Fixed to the stem 12 of the oil valve is a gear wheel 13, in mesh with a gear wheel 14, which is rotatably mounted on a stud shaft 15, on the casting 17. The gear wheel 14 is in mesh with a gear wheel 16, which is rotatably mounted on the stem 11, of the fluid valve. The hub 18 of the gear wheel 16 rests upon a collar 19, which is secured to the stem 11, and resting upon the hub 18 is a collar 20, which is longitudinally movable upon the stem 11. The collar 20 is provided with a key 21, which projects into a slot 22 in the stem 11, whereby the collar 20 is caused to rotate with the stem 11 and is permitted to be moved longitudinally thereof.

The bottom of the collar 20 is provided with teeth 23 which register with teeth 24 in the top of the hub 18 of the gear wheel 16. The teeth 23 and 24 are provided with oppositely inclined faces which permit the teeth 23 to escape the teeth 24 by the vertical movement of the collar 20 upon the stem 11 when the said stem is turned in the direction indicated by the arrow in Fig. 2 to close the fluid valve 9; and the inclined surfaces of the said teeth cause the teeth 23 to engage the teeth 24 and thus turn the gear wheel 16 with the stem 11 when said stem is turned to open the valve 9.

The collar 20 is pressed yieldingly in engagement with the hub 18 by a spring 25 encircling the upper end of the stem 11, and bearing against the collar 20 and the hub of the usual hand wheel 26 on the upper end of the stem 11.

In the construction just described, the following advantages are present:—First; the fluid valve 9 can not be opened without opening the oil valve 10, for the reason that the teeth 23 will engage the teeth 24 and cause the gear wheel 16 to rotate the gear wheel 14, and therewith the gear wheel 13, in a manner to turn the stem 12 to open the oil valve during the turning of the stem 11 to open the fluid valve. Second: the oil valve 10 cannot be closed without closing the fluid valve 9, for the reason that during the turning of the stem 12 in the direction indicated by the arrow in Fig. 2, to close the valve 10, the gear wheel 13 will engage the gear wheel 14, and cause it to turn the gear wheel 16, and thus engage the teeth 24 with the teeth 23 in a manner to cause the collar 20 to turn the stem 11 and close the valve 9. Third; the fluid valve 9 may be closed without closing the oil valve 10, for the reason that during the turning of the stem 11 in the direction indicated by the arrow in Fig. 2, to close the valve 9, the teeth 23 will ride over the teeth 24, (the collar 20 moving vertically against the action of the spring 25), and thus prevent the rotation of the gear wheel 16 and therewith the gear wheels 14 and 13. After the fluid valve 9 has been closed, as just described, the oil valve 10 may be closed by holding the collar 20 against the action of the spring 25, out of engagement with the gear wheel 16, by one hand, while the other hand turns the stem 12 to close the valve 10; after which, the collar 20 may be released.

It will thus be seen from the foregoing description and operation that it is not possible to supply fluid to the motor to operate the same without also supplying the lubricating oil; and that it is not possible to cut off the supply of lubricating oil without cutting off the supply of operating fluid; and further that the supply of operating fluid may be cut off without cutting off the supply of lubricating oil, and the lubricating oil may be then subsequently cut off. In no case, however, can the operating fluid be supplied to the motor without also supplying the lubricating oil.

I claim:—

1. In a fluid operated motor, the combination with the pipe through which the fluid passes to the motor and a moving element of the motor, of an oil pipe in communication with said element, an oil valve to control the last named pipe, a fluid valve to control the first named pipe, and means to prevent the opening of the fluid valve without opening the oil valve and to permit the closing of the fluid valve without closing the oil valve.

2. In a fluid operated motor, the combination with the pipe through which the fluid passes to the motor and a moving element of the motor, of an oil pipe in communication with said element, an oil valve to control the last named pipe, a fluid valve to control the first named pipe, and means to prevent the closing of the oil valve without closing the fluid valve and to permit the closing of the fluid valve without closing the oil valve.

3. In a fluid operated motor, the combination with the pipe through which the fluid passes to the motor and a moving element of the motor, of an oil pipe in communication with said element, an oil valve to control the last named pipe, a fluid valve to control the first named pipe, means to prevent the opening of the fluid valve without opening the oil valve, and to prevent the closing of the oil valve without closing the fluid valve and to permit the closing of the fluid valve without closing the oil valve.

4. In a fluid operated motor, the combination, with the pipe through which the fluid passes to the motor and a moving element of the motor, of an oil pipe in communication with said element, an oil valve provided with an operating stem to control the last named pipe, a fluid valve provided with an operating stem to control the first named pipe, a gear wheel on the stem of the oil valve, a gear wheel on the stem of the fluid valve, and gearing between said gear wheels.

5. In a fluid operated motor, the combination with the pipe through which the fluid passes to the motor and a moving element of the motor, of an oil pipe in communication with said element, an oil valve provided with an operating stem to control said last named pipe, a fluid valve provided with an operating stem to control the first named pipe, a gear wheel fixed to the stem of the oil valve, a gear wheel rotatably mounted on the stem of the fluid valve, gearing between said gear wheels, and means for causing the gear wheel on the stem of the fluid valve to turn therewith when said stem is turned to open its valve.

6. In a fluid operated motor, the combination with the pipe through which the fluid passes to the motor and a moving element of the motor, of an oil pipe in communication with said element, an oil valve provided with an operating stem to control the last named pipe, a fluid valve provided with an operating stem to control the first named pipe, a gear wheel fixed to the stem of the oil valve, a gear wheel rotatably mounted on the stem of the fluid valve, gearing between said gear wheels, and means movable into and out of operative position for causing the gear wheel on the stem of the fluid valve to turn therewith when said stem is turned to open its valve.

7. In a fluid operated motor, the combination with the pipe through which the fluid passes to the motor and a moving element of the motor, of an oil pipe in communication with said element, an oil valve provided with an operating stem to control the last named pipe, a fluid valve provided with an operating stem to control the first named pipe, a gear wheel fixed to the stem of the oil valve, a gear wheel rotatably mounted on the stem of the fluid valve, gearing between said gear wheels, a collar keyed to and longitudinally movable upon the stem of the fluid valve, means for holding said collar yieldingly in engagement with the gear wheel on the stem of the fluid valve, and means for causing said collar to engage with and turn the gear wheel on the stem of the fluid valve when said stem is turned to open its valve, and to disengage itself therefrom when said stem is turned to close its valve.

In testimony whereof I affix my signature in presence of two witnesses.

JOSEPH A. VINCENT.

Witnesses:
PAUL UETZ,
R. P. BARNES.